United States Patent
Suzuki et al.

(10) Patent No.: US 8,036,162 B2
(45) Date of Patent: Oct. 11, 2011

(54) WIRELESS COMMUNICATION SYSTEM AND WIRELESS COMMUNICATION DEVICE

(75) Inventors: Kuniyuki Suzuki, Tokyo (JP); Shinichi Kogure, Tokyo (JP); Toru Mitani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 546 days.

(21) Appl. No.: 12/298,077

(22) PCT Filed: Apr. 26, 2006

(86) PCT No.: PCT/JP2006/308744
§ 371 (c)(1), (2), (4) Date: Oct. 22, 2008

(87) PCT Pub. No.: WO2007/125570
PCT Pub. Date: Nov. 8, 2007

(65) Prior Publication Data
US 2009/0245171 A1    Oct. 1, 2009

(51) Int. Cl.
*H04W 4/00* (2009.01)
(52) U.S. Cl. ........................................ 370/328
(58) Field of Classification Search .................. 370/310, 370/328, 329, 335; 455/138, 266, 307, 422.1
See application file for complete search history.

(56) References Cited

U.S. PATENT DOCUMENTS

| | | | | |
|---|---|---|---|---|
| 3,031,569 | A * | 4/1962 | Mandel | 455/138 |
| 6,112,070 | A * | 8/2000 | Katsuyama et al. | 455/307 |
| 6,215,777 | B1 * | 4/2001 | Chen et al. | 370/335 |
| 6,683,919 | B1 * | 1/2004 | Olgaard et al. | 375/316 |
| 7,383,023 | B2 * | 6/2008 | Hirano et al. | 455/69 |
| 7,512,392 | B2 * | 3/2009 | Millard et al. | 455/266 |

FOREIGN PATENT DOCUMENTS

| | | |
|---|---|---|
| JP | 7 106978 | 4/1995 |
| JP | 10 224659 | 8/1998 |
| JP | 11 239118 | 8/1999 |
| JP | 2002 300097 | 10/2002 |
| JP | 2002 353944 | 12/2002 |

OTHER PUBLICATIONS

"Operator's Requirements for EUTRA and EUTRAN", TSG-RAN WGs Meeting on ULTRA UTRAN LT evolution REV-05047 (2005).
"UE Bandwidth capability, text proposal", TSG-RAN WG1 #44 (2006).

* cited by examiner

*Primary Examiner* — Chi Pham
*Assistant Examiner* — Robert Lopata
(74) *Attorney, Agent, or Firm* — Oblon, Spivak, McClelland, Maier & Neustadt, L.L.P.

(57) ABSTRACT

A wireless communication system and a wireless communication device capable of performing communication by each transmission signal without mutual interference, when a plurality of transmission signals of different communication systems or the same communication systems exist within the same frequency band. The system includes a first wireless communication device, a second wireless communication device, a third wireless communication device, and a fixed band-pass filter and a variable band-pass filter in the third wireless communication device. The first wireless communication signal includes control information indicating a variable pass band in the variable band-pass filter, and the control information is given to the variable band-pass filter, thereby allowing the first wireless communication signal to be selectively passed through the variable band-pass filter, while removing the second wireless communication signal.

11 Claims, 17 Drawing Sheets

FIG. 11
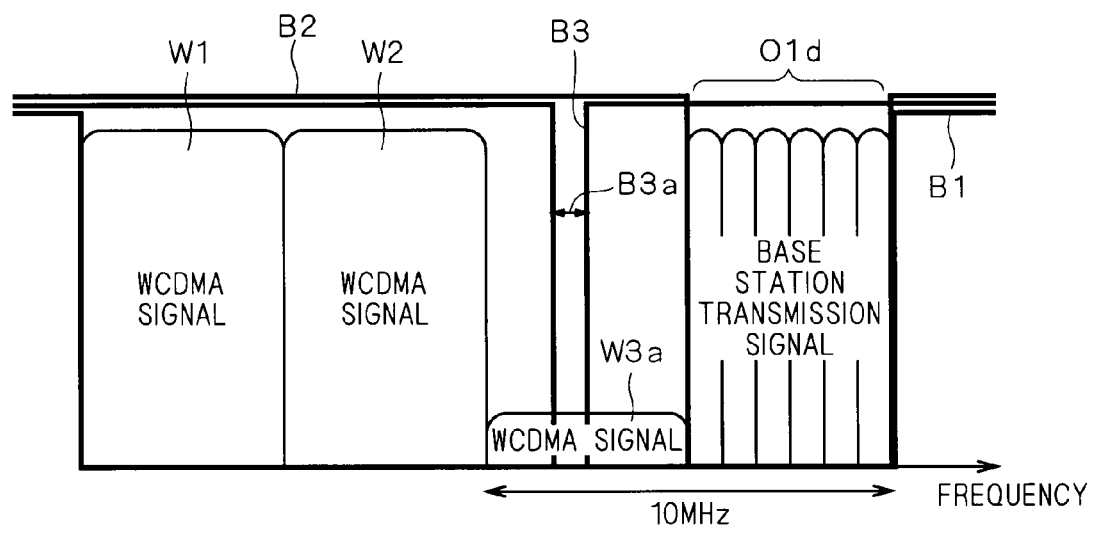
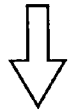
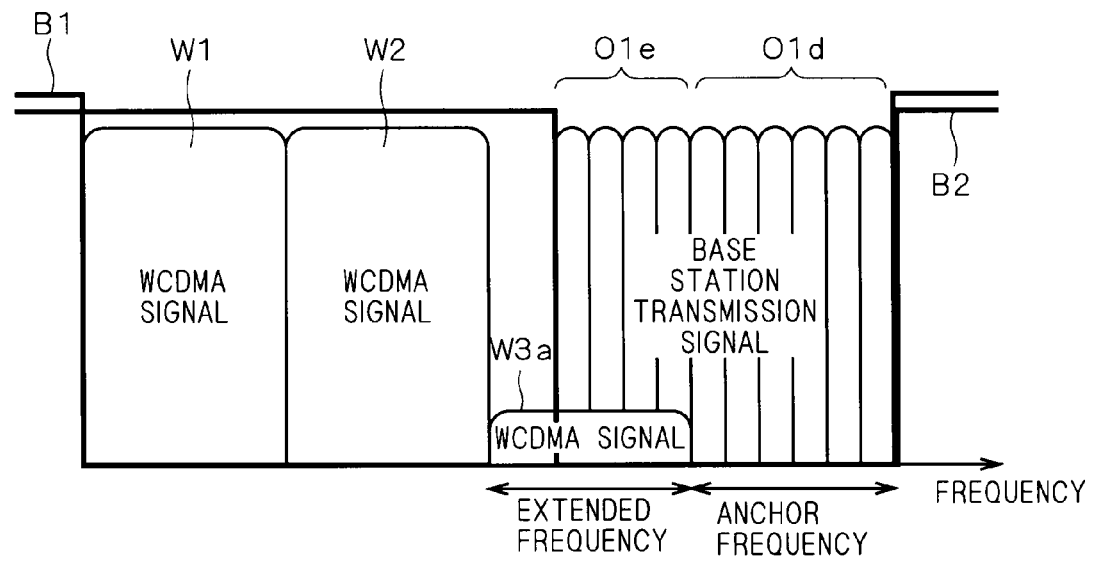

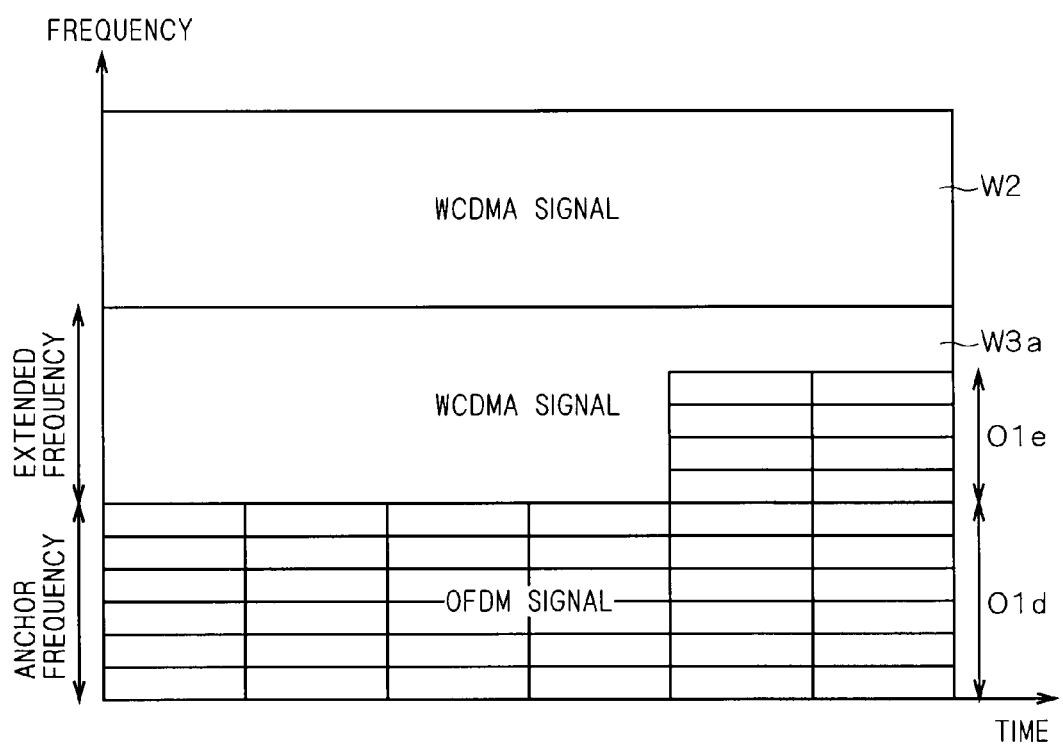
F I G . 1 2

|  | LARGE NUMBER OF USERS | INTERMEDIATE NUMBER OF USERS | SMALL NUMBER OF USERS |
|---|---|---|---|
| LARGE INTERFERENCE | 5 | 4 | 3 |
| INTERMEDIATE INTERFERENCE | 4 | 3 | 2 |
| SMALL INTERFERENCE | 3 | 2 | 1 |

WIRELESS COMMUNICATION SYSTEM AND WIRELESS COMMUNICATION DEVICE

TECHNICAL FIELD

The present invention relates to a wireless communication system and a wireless communication device, and particularly relates to a wireless communication system and a wireless communication device in which a plurality of transmission signals exist in the same frequency band.

BACKGROUND ART

According to a working group of W-CDMA (Wideband-Code Division Multiple Access) which is known as a third-generation mobile telephone communication system, a standard is established in June of 2007, and LTE (Long Term Evolution), namely, Super3G service is scheduled to be introduced from 2009 at the earliest. This Super3G service proposes a technique that other communication system having good frequency utilizing efficiency (such as OFDM: Orthogonal Frequency Division Multiplexing) is also mixed in the same frequency band (for example, 2 GHz band), in addition to the present W-CDMA system.

However, a technique of allowing each transmission signal of a plurality of communication systems to coexist within the same frequency band, as is indicated in the description, "10.Possibility for simplified co-existence between operators in adjacent bands as well as cross-border co-existence" of the non-patent document 1 as described below, involves a problem.

Note that as is described in "11.1.1 Downlink bandwidth capabilities" of the non-patent document 2 as described below, it is agreed that in the Super3G service, a reception frequency width of mobile equipment, being a wireless communication device, is at least 10 MHz.

Non-patent document 1: TSG-RAN WGs Meeting on UTRA UTRAN LT evolution REV-05047 Tokyo, Mar. 7 and 8, 2005

Non-patent document 2: TSG-RAN WG1#44 R1-060733 Denver, Colo., USA, Feb. 13-17, 2006

In a conventional communication system, for example in the W-CDMA, a maximum frequency width of a signal in 2 GHz band is set at 20 MHz. Therefore, in 2009 when the Super3G service is scheduled to be introduced, it is necessary to achieve coexistence of signals of different communication systems within the maximum frequency band, by reducing a use band of a W-CDMA signal within 20 MHz, being the maximum frequency width, and inserting a signal of other communication system (such as an OFDM signal) into this reduced band.

Incidentally, according to the conventional W-CDMA wireless communication device, isolation between wireless communication systems is achieved by using a BPF (Band-pass filter) through which the signal of the maximum frequency width (namely 20 MHz) which is allowable in this wireless communication system is passed, or by using indexes such as an Adjacent Channel Leakage power Ratio: ACLR and an Adjacent Channel Selectivity:ACS.

Here, even in a case where a bandwidth of a signal (such as an OFDM signal) of other communication system introduced in the LTE is set at, for example 5 MHz, the reception frequency width of the mobile equipment, being the wireless communication device, is set to be at least 10 MHz in the Super3G service, as described above. Therefore, when the bandwidth of the signal of other communication system is set at 5 MHz, there is a problem of an interference of the adjacent W-CDMA signal of 5 MHz in the aforementioned 10 MHz. Namely, when a plurality of transmission signals of different communication systems exist within the same frequency band, there is a problem of interference in some cases.

Also, by future introduction of LTE, when the ratio of W-CDMA within the maximum frequency width is reduced, and a plurality of transmission signals of other communication systems (such as OFDM) having good frequency utilizing efficiency exist within the maximum frequency width, there is also a possibility of interference of the transmission signals of the same communication systems.

DISCLOSURE OF THE INVENTION

In order to solve the above-described problem, an object of the present invention is to provide a wireless communication system and a wireless communication device capable of performing communication by each transmission signal without interference with one another, when a plurality of transmission signals of different communication systems or same communication systems exist within the same frequency band.

The present invention is configured by a wireless communication system, including: a first wireless communication device (101) for generating and transmitting a first wireless communication signal (106); a second wireless communication device (104) for generating and transmitting a second wireless communication signal (107) of a different communication system from the communication system of the first wireless communication signal, or the same communication system as the communication system of the first wireless communication signal; and a third wireless communication device (102) for receiving the first and second wireless communication signals, in which the first wireless communication signal (106) and the second wireless communication signal (107) are adjacently positioned on a frequency axis; the third wireless communication device (102) includes a fixing band-pass filter (701) through which the received first wireless communication signal (106) and the second wireless communication signal (107) are selectively passed at a fixed pass band, so that a signal of a total frequency band of the first wireless communication signal (106) and the second wireless communication signal (107) can pass through, also includes a first variable band-pass filter (705) through which the signal passed through the fixed band-pass filter (701) is selectively passed at a variable pass band; the first wireless communication signal (106) includes a control information indicating the variable pass band in the first variable band-pass filter (705); and the control information is given to the first variable band-pass filter (705), thereby enabling the first wireless communication signal (106) to be selectively passed through the first variable band-pass filter (705), while removing the second wireless communication signal (107).

According to the present invention, the first wireless communication signal includes the control information indicating the variable pass band in the first variable band-pass filter, and this control information is given to the first variable band-pass filter, thereby enabling the first wireless signal to be selectively passed through the first variable band-pass filter, while removing the second wireless communication signal. Therefore, it is possible to realize the wireless communication system capable of performing communication by each transmission signal without mutual interference, when a plurality of transmission signals of different communication systems or the same communication systems exist in the same frequency band. Then, the first variable band-pass filter becomes a variable pass band, thus making it possible to respond to a future frequency extension of the first wireless communication signal.

The object, characteristics, aspect, and advantage of the present invention will be apparent by detailed explanation given hereunder and the attached drawings.

BRIEF DESCRIPTION OF THE DRAWINGS

FIG. 11 is a view showing an example of changing signal characteristics of the first wireless communication signal, by expanding a position of the first wireless communication signal on the frequency axis to an area of the second wireless communication signal in the embodiment 2.

FIG. 12 is a view showing an example of time allocation of the first and second wireless communication signals before/after change in FIG. 11.

BEST MODE FOR CARRYING OUT THE INVENTION

Embodiment 1

This embodiment provides a wireless communication system including a first wireless communication device for generating and transmitting a first wireless communication signal; a second wireless communication device for generating and transmitting a second wireless communication signal of a communication system different from the communication system of the first wireless communication signal; and a third wireless communication device for receiving the first and second wireless communication signals, as well as a third wireless communication device, being a part of the wireless communication system, in which the third wireless communication device is provided therein with a fixed band-pass filter and a variable band-pass filter, the first wireless communication signal includes a control information indicating a variable pass band in this variable band-pass filter, and the control information is given to the variable band-pass filter, thereby enabling the first wireless communication signal to be selectively passed through the variable band-pass filter, while removing the second wireless communication signal.

Figure 1:
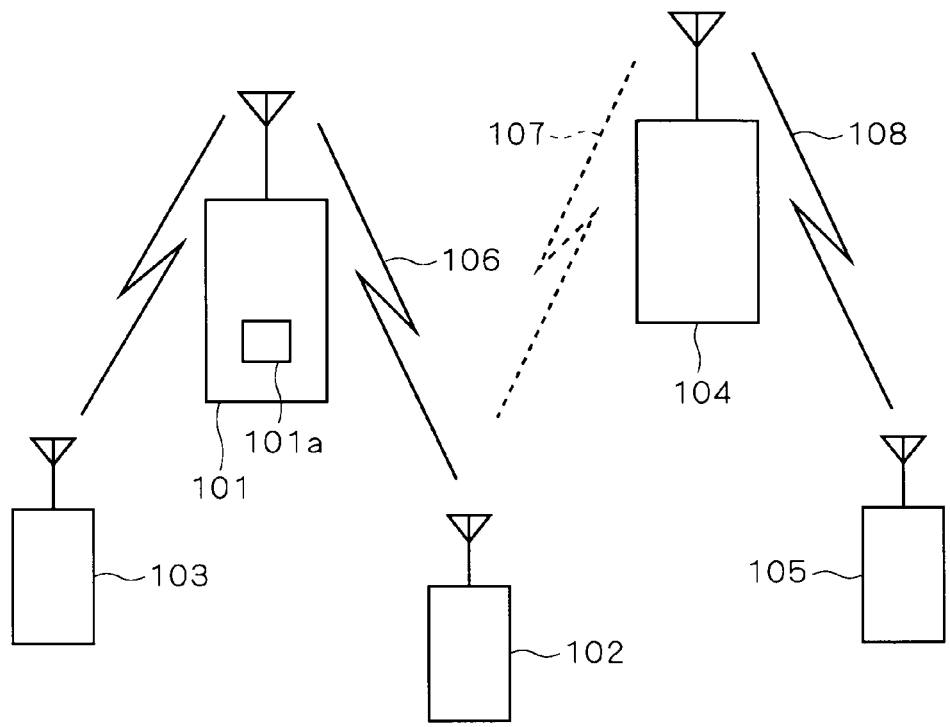
FIG. 1 is a view showing a wireless communication system according to an embodiment 1.

FIG. 1 shows a wireless communication system according to this embodiment. As shown in FIG. 1, this wireless communication system includes a base station 101, being the first wireless communication device for generating and transmitting a first wireless communication signal 106; a base station 104, being the second wireless communication device for generating and transmitting second wireless communication signals 107 and 108 of communication systems different from the communication system of the first wireless communication signal 106, mobile equipment 102, being the third wireless communication device for receiving the first and second wireless communication signals 106 and 107, and other mobile equipments 103 and 105.

Out of them, the base station 104 is a base station of the existing communication system, for example a W-CDMA base station. Namely, the second wireless communication signals 107 and 108 transmitted from the base station 104 are W-CDMA signals. Note that it is not a problem whether TDD (Time Division Duplex) is employed or FDD (Frequency Division Duplex) is employed in the base station 104. Also, other than the W-CDMA base station, the base station 104 may be, for example TD-SCDMA (Time Division Synchronous Code Division Multiple Access) base station or may be TDMA (Time Division Multiple Access) base station such as GSM (Global System for Mobile Communications) or PDC (Personal Digital Cellular). Alternately, the base station 104 may be PHS (Personal Handyphone System) base station or may be WiMAX (IEEE802.16d/e:Worldwide Interoperability for Microwave Access) base station.

Meanwhile, the base station 101 is a base station for generating and transmitting a first wireless communication signal 106 of the communication system different from the communication system of the second wireless communication signals 107 and 108 transmitted from the base station 104, for example an OFDM base station corresponding to LTE (Super3G service) of W-CDMA. Namely, the second wireless communication signal 106 transmitted from the base station 101 is an OFDM signal corresponding to Super3G service. Note that other than the OFDM base station, the base station 101 may be the base station of the communication system using other multi carrier.

The mobile equipment 105 serves as a W-CDMA mobile equipment that receives the second wireless communication signal 108 from the base station 104, and the mobile equipment 102 serves as the mobile equipment corresponding to the Super3G service that receives the first wireless communication signal 106 from the base station 101. In addition, the mobile equipment 103 also serves as the mobile equipment corresponding to the Super3G service. Note that the second wireless communication signal 107 is propagated to the mobile equipment 102 as an interference signal from the base station 104.

Figure 2:
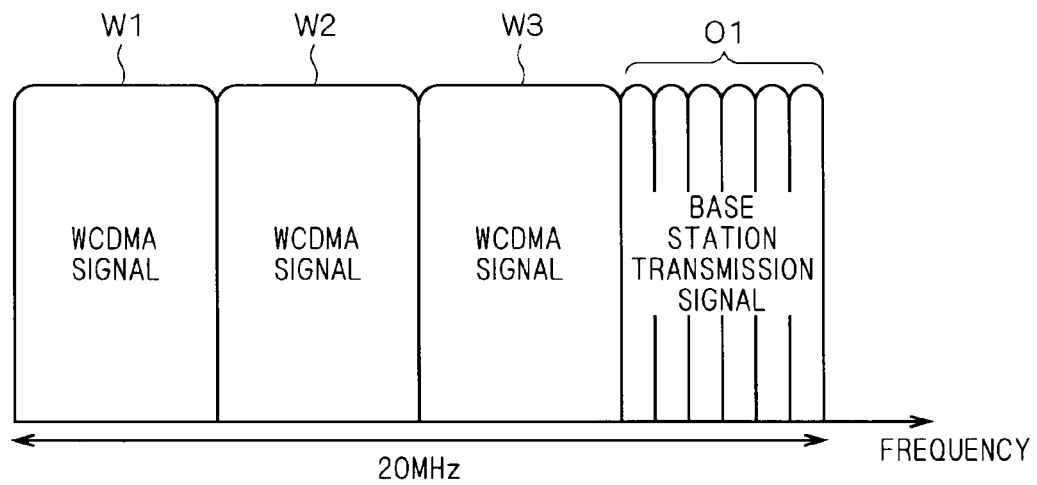
FIG. 2 is a view showing an example of frequency allocation of first and second wireless communication signals.

Next, explanation will be given for an example of the frequency allocation of the first and second wireless communication signals 106 and 107 received by the mobile equipment 102. FIG. 2 is a view explaining the example of this frequency allocation. The second wireless communication signal 107, being the W-CDMA signal, is a signal having 3 waves of the frequency band of 5 MHz, like W-CDMA signals W1 to W3, for example. In addition, the first wireless communication signal 106, being the OFDM signal, is 6 lines of orthogonal multiplexed signal having the frequency band of 5 MHz, like OFDM signal O1, for example. Also, as shown in FIG. 2, the first wireless communication signal 106 and the second wireless communication signal 107 are adjacently positioned on the frequency axis.

Namely, in the example of the frequency allocation of FIG. 2, for example, the use band of the W-CDMA signal of 5 MHz width in the maximum frequency width 20 MHz of the signal in 2 GHz band is reduced from 4 waves to 3 waves (W1 to W3) and the OFDM signal O1 corresponding to the Super3G service is inserted into the reduced band.

Here, provided that the Super3G service has a better frequency efficiency than W-CDMA of a conventional system, it can be estimated that 3 waves (15 MHz) of the W-CDMA signals W1 to W3 are eventually reduced from 2 waves (10 MHz) to 1 wave (5 MHz) step by step, and the OFDM signal O1 is extended by this reduction.

In this case, in the mobile equipment 102, the OFDM signal of the frequency band other than 5 MHz of the OFDM signal O1 in FIG. 2 must be made receivable, so as to correspond to the future extended OFDM signal O1. Namely, in this application, the mobile equipment 102, being the third wireless communication device includes a fixed band-pass filter through which the received first wireless communication signal 106 and the second wireless communication signal 107 are selectively passed at a fixed pass band (20 MHz), so that the signal of a total frequency band (20 MHz) of the first wireless communication signal 106 and the second wireless communication signal 107, namely the OFDM signal O1 and the W-CDMA signals W1 to W3 can pass through; and includes a variable band-pass filter through which the signal passed through the fixed band-pass filter is further selectively passed at the variable pass band, so that only the OFDM signal O1 is taken out.

Figure 3:
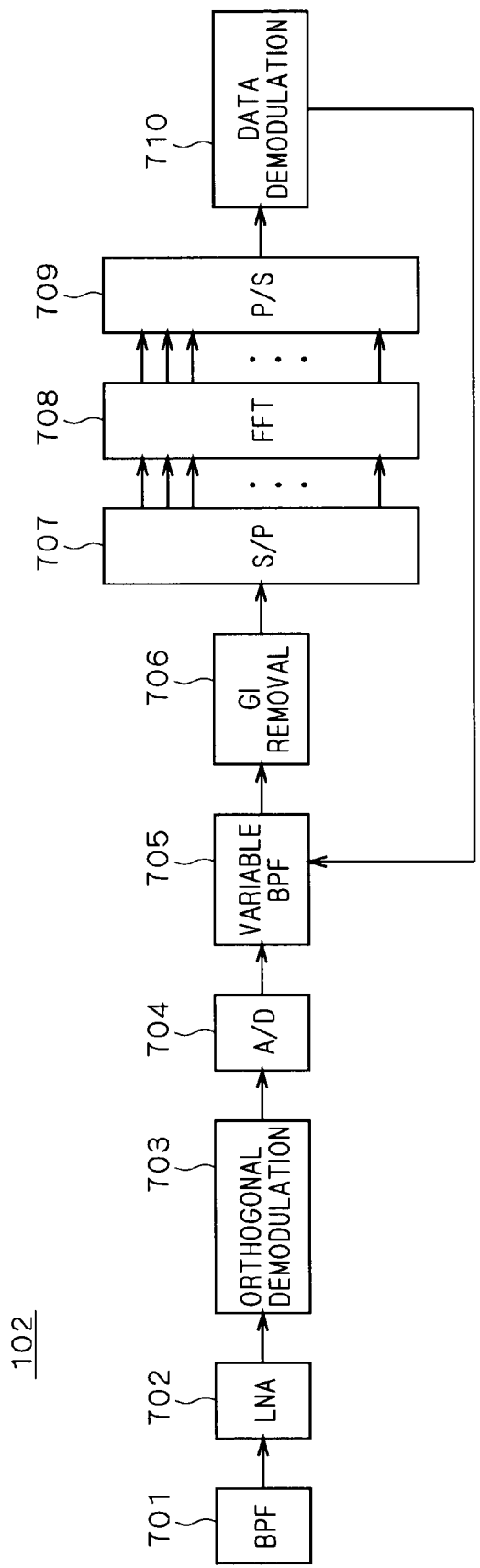
FIG. 3 is a block diagram of the wireless communication device according to the embodiment 1.

FIG. 3 is a block diagram of the mobile equipment 102, being the third wireless communication device according to this embodiment. The mobile equipment 102 includes the aforementioned fixed band-pass filter 701; an LNA (Low Noise Amplifier) 702 that amplifies an output signal from the fixed band-pass filter 701; and an orthogonal demodulation part 703 that down-converts the output signal (wireless frequency signal) from the LNA 702 to a baseband signal, and thereafter performs orthogonal demodulation (direct conversion).

Further, the mobile equipment 102 includes an A/D converter 704 that performs A/D (Analog to Digital) conversion to the output signal from the orthogonal demodulation part 703; the aforementioned variable band-pass filter 705 that inputs the output signal from the A/D converter 704; a GI removing part 706 that removes a gap interval (GI) of the OFDM signal from the output signal of the variable band-pass filter 705; an S/P conversion part 707 that performs serial-parallel conversion of the output signal from the GI removing part 706; an FFT part 708 that performs fast Fourier transform to the output signal from the S/P conversion part 707; a P/S conversion part 709 that performs parallel-serial conversion of the output signal form the FFT part 708; and a data demodulation part 710 that performs demodulation processing of a multi-value modulation to the output signal from the P/S conversion part 709.

In the FFT part 708, in addition to the fast Fourier transform, transmission line estimation and phase correction may also be performed from the known signal line, etc, as needed. Also, in the data demodulation part 710, in addition to the demodulation processing of the multi-value modulation, de-interleave processing and error correction processing, etc, may also be performed, as needed.

Note that in consideration of future extensibility of the OFDM signal O1, in the fixed band-pass filter 701, it is preferable to employ a fixed pass band through which the signal having the maximum frequency width 20 MHz of the signal of 2 GHz band is passed. The fixed band-pass filter 701 has a function of removing undesired radio waves in the frequency band other than the pass band. In addition, the variable band-pass filter 705 may employ a programmable digital filter capable of allowing the wireless communication signal to pass through a desired pass band (5 $MH_2$ of the OFDM signal O1 in the example of FIG. 2), by change of a filter coefficient.

Figure 4:
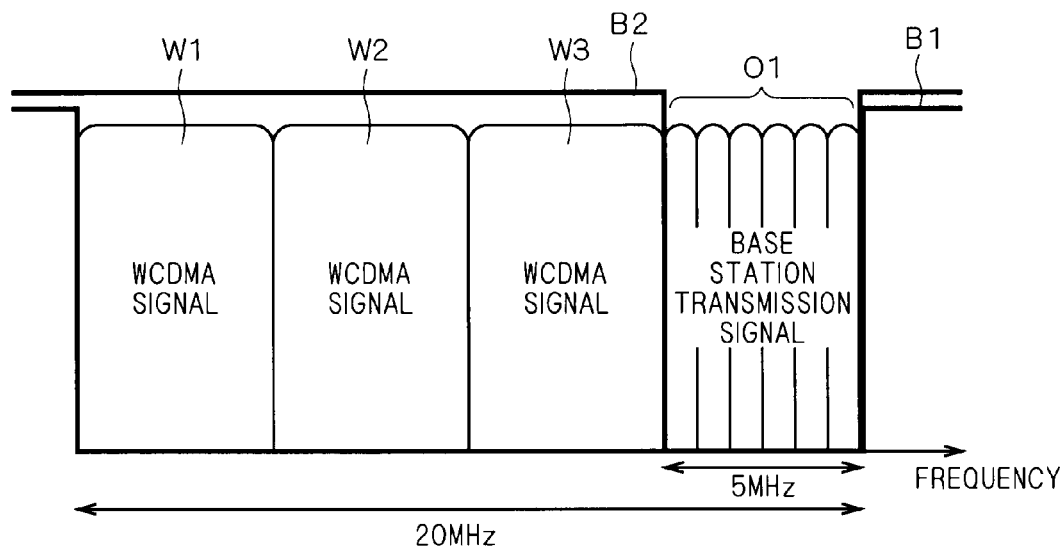
FIG. 4 is a view showing an example of filtering by each band-pass filter.

FIG. 4 is a view showing an example of filtering by each band-pass filter. As shown in FIG. 4, according to the filtering characteristic B1, 20 MHz, being the total of 15 MHz of the W-CDMA signals W1 to W3 and 5 MHz of the OFDM signal O1 is set as the pass band, and meanwhile, according to the filtering characteristic B2, only 5 MHz of the OFDM signal O1 is set as the pass band.

Incidentally, the control information indicating the variable pass band in the variable band-pass filter 705 is included in the first wireless communication signal 106. Then, this control information is demodulated in the data demodulation part 710, which is given to the variable band-pass filter 705 from the data demodulation part 710 as a feedback signal to the variable band-pass filter 705, thereby enabling the first wireless communication signal 106 (5 MHz of the OFDM signal O1 in the example of FIG. 2) is selectively passed through the variable band-pass filter 705, while removing the second wireless communication signal 107 (15 MHz of the W-CDMA signals W1 to W3 in the example of FIG. 2).

Next, explanation will be given for the control information indicating the variable pass band in the variable band-pass filter 705. A packet and voice data are exchanged with each other by the first wireless communication signal 106 between the base station 101 and the mobile equipment 102. In addition, the base station 101 includes the control information indicating the variable pass band in the variable band-pass filter 705 in the first wireless communication signal 106, and then transmits to the mobile equipment 102.

As a transmission method thereof, it is possible to employ a method of notifying as a notification from a base station area (sector area when a sector structure is taken) using notification channels, or a method of notifying as a communication using control channels for every individual channel. In addition, even when the communication is performed by using one control channel by forming a plurality of mobile equipments into a group, it is possible to employ a notifying method based on the control channels of every individual channel.

When the control channels of the individual channel are used, the control information may be notified by signaling by L1 (Layer 1) defined by the Super3G service or may be notified as a message of L2 (Layer 2) and L3 (Layer 3) defined by the Super 3G service.

Four examples of giving and receiving the message are shown in FIGS. 5 to 8. FIGS. 5 to 8 are views showing an example of each sequence of giving and receiving the control information indicating the pass band in the variable band-pass filter.

Figure 5:
FIG. 5 is a view showing an example of a first sequence for giving and receiving control information indicating a pass band in a variable band-pass filter.

FIG. 5 is an example of the sequence using the notification channels to the mobile equipment from the base station. An optimal notification channel is notified in accordance with a peripheral propagation environment, for each base station or each sector. As soon as the change of the notification channels is recognized, the mobile equipment changes the frequency band.

Figure 6:
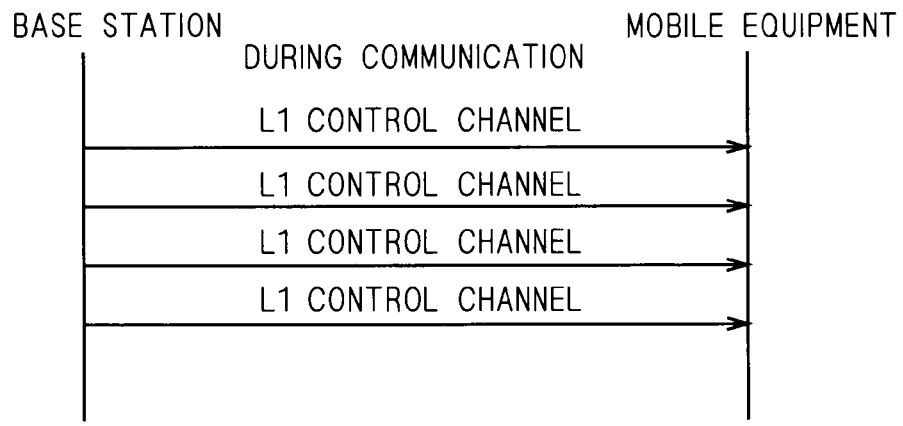
FIG. 6 is a view showing an example of a second sequence for giving and receiving the control information indicating the pass band in the variable band-pass filter.

FIG. 6 shows an example of the sequence using signaling by L1. It may be transmitted prior to a time period for changing the filter characteristic, a specific time period from an actual data transmission. The mobile equipment that receives the control information may perform change of frequency from the data after the specific time is elapsed after receiving this signaling (when transmission is performed with giving an advance notice before transmitting the actual data).

Figure 7:
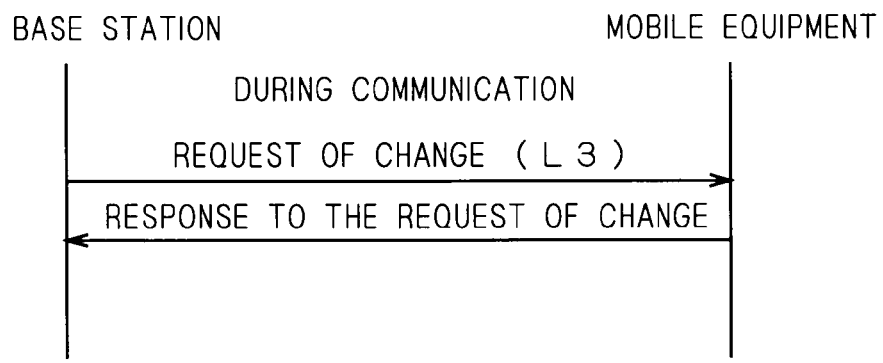
FIG. 7 is a view showing an example of a third sequence for giving and receiving the control information for indicating the pass band in the variable band-pass filter.
Figure 8:
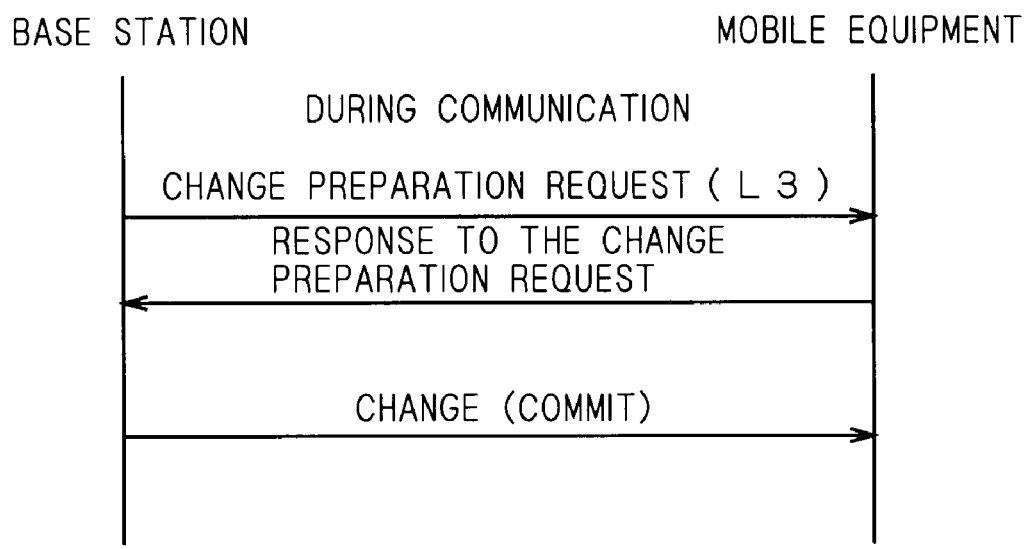
FIG. 8 is a view showing an example of a fourth sequence for giving and receiving the control information indicating the pass band in the variable band-pass filter.

Also, FIG. 7 and FIG. 8 show an example of the sequence using the message by L3. FIG. 7 shows an example in which, to a message requesting for frequency change by L3 from the base station, the mobile equipment instantaneously executes the conversion of the frequency and returns a response message thereto. Also, FIG. 8 shows an example in which, to a message requesting a preparation for frequency conversion by L3 from the base station, the mobile equipment notifies that it require the preparation for change, and the base station returns a commit message thereto. In the commit message, at least a timing of changing the frequency band is designated, and the mobile equipment designates the timing when the frequency band can be changed after this designated timing. The designated timing can be systematically and uniquely determined, and for example, it can be the timing matching the cycle of the notification channels. Generally, a data frame is partitioned to about 0.5 ms to 40 ms for wireless transmission. However, notification information has a large data size and TDM (Time Division Multiplex) transmission or FDM (Frequency Division Multiplex) transmission, or CDM (Code Division Multiple) transmission is performed over a long time period. Alternately, separately from the notification channels, a system clock of a sufficient long time may be defined and the designated timing may be defined by such timing.

When the notification channels are used, simple control to the base station in the area becomes possible, and when the individual channel is used, dynamic switch of the used frequency becomes possible, thus improving the frequency utilizing efficiency. Then, when the commit message is used, switching timing can be correctly matched between a transmission side and a reception side, while the frequency is dynamically switched, thus enabling the efficient change.

In the above description, as a position example of the variable band-pass filter 705, the post-stage of a base band signal conversion by the orthogonal demodulation part 7 is employed. However, besides the above, for example, it is also possible to provide a function of converting the wireless frequency signal to IF (Intermediate Frequency), then position the variable band-pass filter 705 in the post-stage thereof, so that the IF signal is passed through this variable band-pass filter 705.

Also, in the above description, as a constitutional example of the variable band-pass filter 705, the digital filter is shown. However, not only the digital filter but also a programmable analogue filter may also be used. Also, as the structure of the variable band-pass filter 705, it is possible to use a method of arranging filters having a plurality of filter characteristics in parallel and using by switching them, and also possible to use a method of combining these methods and switching of a center frequency by synthesizer.

Note that regarding the variable band-pass filter 705, in a multi carrier communication system such as OFDM having inter-carrier orthogonality, even when a part in the multi carrier is used, it is not necessary to form such a filter through which the signal is passed in discontinuous frequency ranges, accordingly.

According to the wireless communication system and the wireless communication device of this embodiment, the first wireless communication signal 106 includes the control information indicating the variable pass band in the variable band-pass filter 705, and the control information is given to the variable band-pass filter 705, thereby enabling the first wireless communication signal 106 can be selectively passed through the variable band-pass filter 705, while removing the second wireless communication signal 107. Therefore, it is possible to realize the wireless communication system and the wireless communication device capable of performing communication by each transmission signal without mutual interference, when a plurality of transmission signals of different communication systems exist in the same frequency band. Then, since the variable band-pass filter 705 serves as the variable pass band, it is possible to respond to a future frequency extension of the first wireless communication signal 106.

In addition, by using the above-described structure, in the W-CDMA signal and the OFDM signal, when a so-called carrier raster is performed and frequency offset occurs due to a peripheral radio wave environment, the frequency efficiency can be made maximum by changing a filter coefficient. Here, the carrier raster indicates a state in which by the base station 101 and the base station 104, the position of the first wireless communication signal 106 and the second wireless communication signal 107 on the frequency axis is moved.

Figure 9:
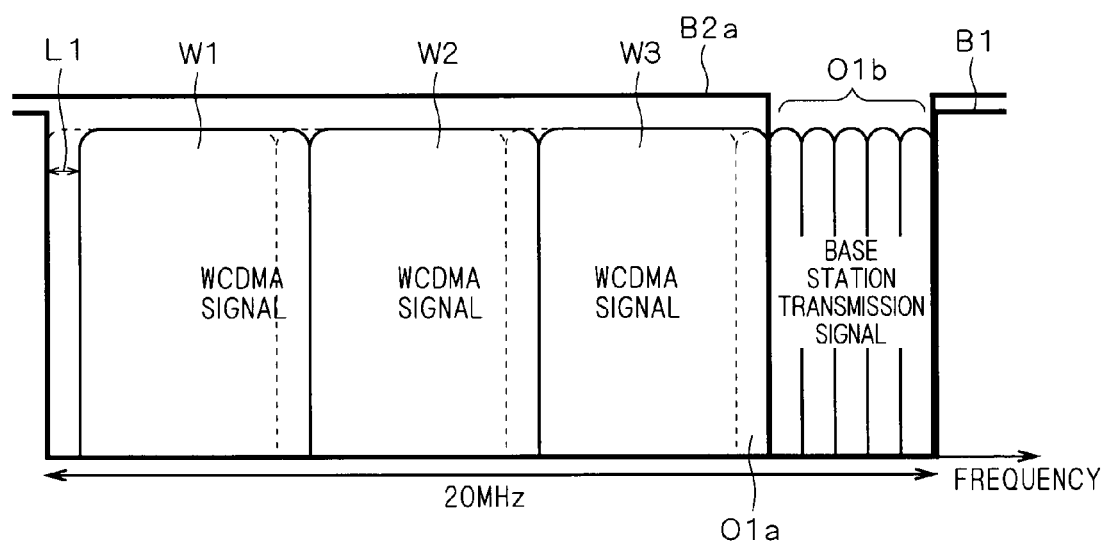
FIG. 9 is a view showing an example of a frequency allocation of the first and second wireless communication signals when carrier raster is performed.

FIG. 9 is a view showing an example of the frequency allocation of the first and second wireless communication signals 106 and 107 when the carrier raster is performed. In this FIG. 9, as an example, one sub-carrier O1a is reduced from the OFDM signal O1, to convert the OFDM signal O1 to OFDM signal O1b by carrier raster.

At this time, by updating the control information from the base station 101 so as to have a pass band which is narrower than the band width 5 MHz of the OFDM signal O1 by one sub-carrier O1a, the pass band in the variable band-pass filter 705 can be changed, thus making it possible to suppress an interference wave from the adjacent W-CDMA signal W3 to minimum.

Namely, according to the wireless communication system of this embodiment, the control information is updated so that the first wireless communication signal 106 is selectively passed through the variable band-pass filter 705, while removing the second wireless communication signal 107, when the positions of the first wireless communication signal 106 and the second wireless communication signal 107 are moved on the frequency axis. Therefore, even when the so-called carrier raster is performed, communication by each transmission signal can be performed without mutual interference.

Note that in the above description, although control of the frequency band in the mobile equipment 102 has been explained, the aforementioned contents can be established even if the mobile equipment 102 and the base station 101 are replaced with each other. In the above description, the control of the frequency band is based on the assumption that the base station 101 is regarded as the first wireless communication device for generating and transmitting the first wireless communication signal 106, and the mobile equipment 102 is regarded as the third wireless communication device for receiving the first and second wireless communication signals 106 and 107.

However, the mobile equipment 102 also has the function (not shown) of generating and transmitting the wireless communication signal, and the base station 101 also has the function of receiving the wireless communication signal from the mobile equipment 102 and the second wireless communication signal 107 from the base station 104, being the second wireless communication device. Namely, the reception block 101a exists in the base station 101, and the reception block 101a has the same structure as that of the block diagram of the mobile equipment shown in FIG. 3.

Namely, it is also possible to consider in such a manner that the mobile equipment 102 is regarded as the first wireless communication device for generating and transmitting the first wireless communication signal 106, and the base station 101 is regarded as the third wireless communication device for receiving the first and second wireless communication signals 106 and 107.

Note that the present invention can be applied to a case in which the base stations 101 and 104 have a host device of the base station that integrates them, or can be applied to a system in which cooperation between the base stations 101 and 104 is not established in management of a wireless resource.

Embodiment 2

This embodiment is a modified example of the wireless communication system and the wireless communication device according to the embodiment 1, with the mobile equipment 102, being the third wireless communication device, including a further variable band-pass filter; a power measurement part for measuring power of a signal passed therethrough; and a transmission processing part for transmitting a measurement result, in which the base station 101 receives the measurement result and information of changing the signal characteristics of the first wireless communication signal 106 and/or information of changing filtering characteristics in the variable band-pass filter 705 is included in the control information.

The structure of the wireless communication system according to this embodiment is the same as that of FIG. 1, and therefore explanation therefore is omitted. However, the structure of the mobile equipment 102, being the third wireless communication device for receiving the first and second wireless communication signals 106 and 107 is different from that of FIG. 3.

Figure 10:
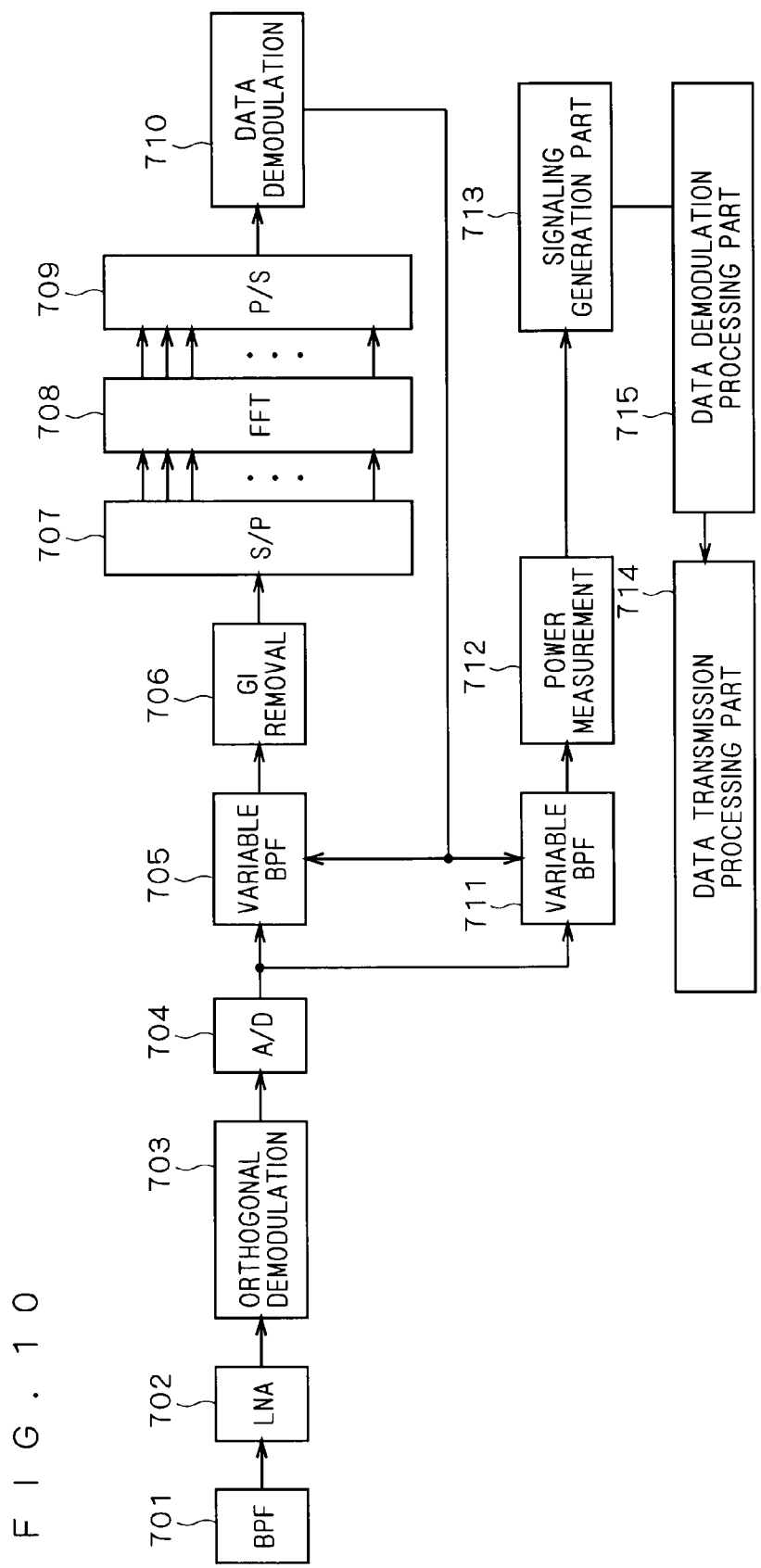
FIG. 10 is a block diagram of the wireless communication device according to an embodiment 2.

FIG. 10 shows the block diagram of the mobile equipment 102, being the wireless communication device according to this embodiment. This mobile equipment 102 includes the fixed band-pass filter 701, LNA 702, the orthogonal demodulation part 703, the A/D converter 704, the variable band-pass filter 705, the GI removing part 706, the S/P conversion part 707, the FFT part 708, the P/S conversion part 709, and the data demodulation part 710 that are the same functions and connection structure shown in FIG. 3.

In addition, the mobile equipment 102 further includes a second variable band-pass filter 711 for inputting the output signal from the A/D converter 704; a power measurement part 712 for measuring the power of the signal passed through the variable band-pass filter 711; a signaling generation part 713 for shaping the measurement result in the power measurement part 712 into a form adequate to signaling; a data demodulation processing part 715 for applying a required demodulation processing such as multi value demodulation and SC(Single Carrier)-FDMA to the output signal of the signaling generation part 713; and a data transmission processing part 714 for converting the output signal of the data demodulation processing part 715 to analog, and performing up-conversion and power amplification, to transmit to the base station 101, being the first wireless communication device.

According to this embodiment, the first wireless communication signal 106 also includes the control information indicating the variable pass band in the variable band-pass filter 711. Then, this control information is demodulated by the data demodulation part 710, which is then given to the variable band-pass filter 711 as the feedback signal to the variable band-pass filter 711 from the data demodulation part 710, thereby enabling at least a part of the second wireless communication signal 107 (in the example of FIG. 2, for example a part of the W-CDMA signal W3 adjacent to the OFDM signal O1) is selectively passed through the variable band-pass filter 711, while removing the first wireless communication signal 106 (in the example of FIG. 2, 5 MHz of the OFDM signal O1).

Thus, the signal filtered by the variable band-pass filter 711 is used for measuring by the power measurement part 712, a received power of the W-CDMA signal W3 adjacent to the OFDM signal O1 which is to be processed by the mobile equipment 102. The measurement result of the received power is transmitted to the base station 101 by the data transmission processing part 714. Then, the base station 101 receives the measurement result, and in accordance with a value of a transmission power of the second wireless communication signal 107, changes the signal characteristic of the first wireless communication signal 106, or transmits the information for changing the filtering characteristic in the variable band-pass filter 705 in a state of being included in the control information, or perform both thereof.

Next, more detailed operation will be explained, by using FIG. 11 and FIG. 12. FIG. 11 is a view showing an example of changing the signal characteristic of the first wireless communication signal 106, by expanding the position of the first wireless communication signal 106 on the frequency axis to the area of the second wireless communication signal 107. In addition, FIG. 12 is a view showing an example of time allocation of the first and second wireless communication signals 106 and 107 before/after change in FIG. 11.

Note that FIG. 11 shows a case of low signal strength of the W-CDMA signal W3 which is expressed by W3a. Also, the reference code of the OFDM signal O1 is altered to anchor frequency O1d and extended frequency O1e as will be described later.

In FIG. 11, in the same way as the embodiment 1, as the filtering characteristic B1 of the fixed band-pass filter 701, 20 MHz, being the total of 15 MHz of the W-CDMA signals W1 to W3 and 5 MHz of the OFDM signal O1, is set as the pass band. In addition, in a state before changing the filtering characteristic shown in an upper part of FIG. 11, in the same way as the case of the embodiment 1, as the filtering characteristic B2 of the variable band-pass filter 705, only 5 MHz of the OFDM signal O1 is set as the pass band.

As the filtering characteristic B3 of the variable band-pass filter 711, for example, a part of the W-CDMA signal W3a adjacent to the OFDM signal O1 is set as the variable pass band B3a. Then, the power of the signal passed through the variable band-pas filter 711 is measured by the power measurement part 712, and a measured power value is averaged until sufficient precision is obtained by the signaling generation part 713. Thereafter, the information of the measurement result of the received power is transmitted to the base station 101, via the data demodulation processing part 715 and the data transmission processing part 714. Note that the information of the measurement result may be transmitted to the host device of the base station 101 via the base station 101.

The base station 101 receives the information of the measurement result, and when the value of the power of a monitored signal passed through the variable band-pass filter 711, namely the power value of the W-CDMA signal W3 becomes smaller than a certain threshold value, transmits the signaling for changing the signal characteristic of the first wireless communication signal 106 to be used to the mobile equipment 102, and thereafter starts transmission of data. More specifically, as shown in a lower part of FIG. 11, the base station 101 changes the signal characteristic of the first wireless communication signal 106 by expanding the position of the first wireless communication signal 106 on the frequency axis to the area of the second wireless communication signal 107, and updates the control information so that the first wireless communication signal 106 after expansion can be selectively passed through the variable band-pass filter 705 while removing the second wireless communication signal 107 by changing the filtering characteristics B2.

As shown in FIG. 12 showing the example of the time allocation of the first and second wireless communication signals 106 and 107 before/after change, the OFDM signal O1 has the signal also in an extended frequency O1e in addition to the anchor frequency O1d, after expansion of the frequency position of the first wireless communication signal 106 by the base station 101. Note that according to this application, the position of the first wireless communication signal 106 on the frequency axis before expansion is defined as the anchor frequency range, and the position of an increased portion of the first wireless communication signal 106 on the frequency axis after expansion is defined as an extended frequency range.

According to the wireless communication system and the wireless communication device of this embodiment, the power measurement part 712 measures the power of the signal passed through the variable band-pass filter 711, and the measurement result by this power measurement part 712 is received by the base station 101, being the first wireless communication device, and in accordance with the value of transmission power of the second wireless communication signal 107, the signal characteristic of the first wireless communication signal 106 is changed. Therefore, in accordance with a state of the transmission power of the second wireless communication signal 107 positioned adjacent to the first wireless communication signal 106 on the frequency axis, the signal of the first wireless communication signal 106 can be reinforced.

Then, by expanding the position of the first wireless communication signal 106 on the frequency axis to the area of the second wireless communication signal 107, the base station 101, being the first wireless communication device, changes the signal characteristic of the first wireless communication signal 106. Therefore, in accordance with the state of the transmission power of the second wireless communication signal 107, the frequency band of the first wireless communication signal 106 can be extended, and a high speed communication of the first wireless communication signal 106 can be achieved.

Note that the change of the signal characteristics of the first wireless communication signal 106 is not limited to the expansion of the frequency position of the first wireless communication signal 106 as shown in FIG. 11 and FIG. 12 and may be performed, for example, by reinforcing the strength of the transmission signal of at least a part of the first wireless communication signal 106 on the frequency axis.

Namely, for example, the base station 101 may increase the signal strength of the first wireless communication signal 106 by the signal strength of the value of the power of the monitored signal passed through the variable band-pass filter 711, namely, by the power value of the W-CDMA signal W3. For example, when average signal strength of the W-CDMA signal W3 is 3 dB, it is preferable to increase the signal strength of the first wireless communication signal 106 by 3 dB.

Thus, when the base station 101, being the first wireless communication device, changes the signal characteristics of the first wireless communication signal 106 by reinforcing the strength of the transmission signal of at least a part of the first wireless communication signal 106 on the frequency axis, in accordance with the state of the transmission power of the second wireless communication signal 107, the first wireless communication signal 106 can be reinforced, and a reliable communication of the first wireless communication signal 106 can be achieved.

Note that when the expansion of the frequency position of the first wireless communication signal 106 and reinforcement of the strength of the transmission signal of the first wireless communication signal 106 are simultaneously performed, it is preferable to increase the transmission power by the base station 101 only in a part of the frequency band where the W-CDMA signal W3, being an interference wave, exist. This makes it possible to realize a highest frequency utilizing efficiency.

Meanwhile, it is also possible to reinforce the first wireless communication signal 106 by the base station 101 uniformly in a reception frequency band of the mobile equipment 102. The mobile equipment 102 may use the information of the increased portion of the first wireless communication signal 106 obtained by the signaling of increase in the transmission power from the base station 101, as offset of a transmission power value of common channels and contention channels, an initial transmission power value at the time of starting transmission of individual channels (including the common channels), and a transmission power value of the individual channels (including the common channels) during communication.

In addition, when the measurement result of the power measurement part 712 is received by the base station 101, not the information of changing the signal characteristics of the first communication signal 106, but the information of changing the filtering characteristic of the variable band-pass filter 705 in accordance with the transmission power value of the second wireless communication signal 107 may be included in the control information. Namely, considering that power consumption in the variable band-pass filter 705 becomes greater as the filtering characteristics is made steeper, the filtering characteristics of the variable band-pass filter 705 may be classified by stages.

In a state of a heavy traffic in which a high-capacity communication is performed with a plurality of users, steep filtering characteristics is desired so that distinction of the plurality of users can be made, even if there is an increase of the power consumption of the variable band-pass filter 705.

Meanwhile, in a low traffic state, operation of prioritizing the power consumption of the mobile equipment is performed by making a filter-through state, even if the adjacent W-CDMA is used.

Figures 13, 14:
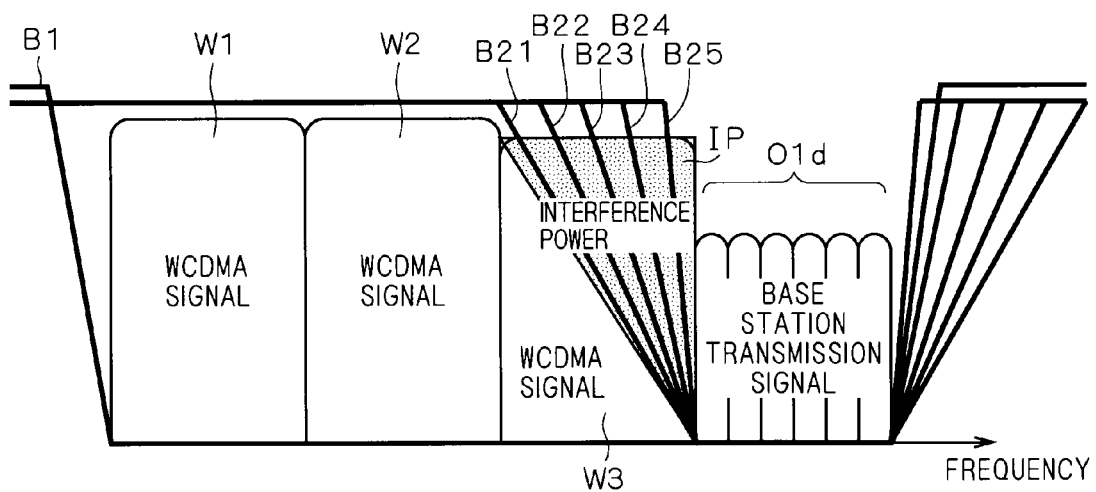
FIG. 13 is a view showing variable filtering characteristics in the embodiment 2.
FIG. 14 is a view showing an example of numerical values of the filtering characteristics for the number of users and amount of interference in the embodiment 2.

FIG. 13 is a view showing the variable filtering characteristics of the variable band-pass filter 705. As shown in FIG. 13, an actual filtering characteristics shows an appearance of a smooth characteristics, and an interference wave IP of the second wireless communication signal 107, being the adjacent channel can not be completely 0, thus allowing the interference wave to leak and enter.

Therefore, the filtering characteristics of the variable band-pass filter 705 is made changeable from characteristics B21 to B25. Then, based on the measurement result of the power measurement part 712, the base station 101 includes in the control information the information of changing the filtering characteristics so as to obtain a steep filtering characteristics of the variable band-pass filter 705 when the transmission power of the second wireless communication signal 107 is relatively high, and includes in the control information the information of changing the filtering characteristics so as to obtain a smooth filtering characteristics of the variable band-pass filter 705, when the transmission power of the second wireless communication signal 107 is relatively low. Based on this control information, the variable band-pass filter 705 changes the filtering characteristics to a suitable one out of the characteristics B21 to B25.

FIG. 14 is a view showing an example of numerical values of the filtering characteristics with respect to the number of users and interference amount. In FIG. 14, for example, numerical value 1 of the filtering characteristic is defined as a steep characteristic of 5 dB (referred to average attenuation per adjacent 5 MHz), numerical value 2 is defined as the steep characteristic of 10 dB, numerical value 3 is defined as the steep characteristic of 20 dB, numerical value 4 is defined as the steep characteristic of 30 dB, numerical value 5 is defined as the steep characteristic of 40 dB, respectively. Then, the case of the numerical value 1 corresponds to characteristic B21, and similarly the case of the numerical value 2 corresponds to characteristic B22, the case of the numerical value 3 corresponds to characteristic B23, the case of the numerical value 4 corresponds to characteristic B24, and the case of the numerical value 5 corresponds to characteristic B25, respectively, in FIG. 13.

Thus, according to this embodiment, the power measurement part 712 measures the power of the signal passed through the variable band-pass filter 711, and the base station 101, being the first wireless communication device, receives the measurement result of the power measurement part 712, and in accordance with the value of the transmission power of the second wireless communication signal 107, it is also possible to include in the control information, the information of changing the filtering characteristic of the variable band-pass filter 705. Thus, in accordance with the state of the transmission power of the second wireless communication signal 107 positioned on the frequency axis adjacently to the first wiring communication signal 106, the filtering characteristics in the variable band-pass filter 705 can be made steep.

Then, the base station 101, being the first wireless communication device, includes in the control information the information of changing the filtering characteristics so as to show a steep filtering characteristics of the variable band-pass filter 705 when the transmission power of the second wireless communication signal 107 is relatively high, and includes in the control information the information of changing the filtering characteristics so as to show a smooth filtering characteristic of the variable band-pass filter 705 when the transmission power of the second wireless communication signal 107 is relatively low. Generally, when the filtering characteristics is steep in the variable band-pass filter 705, although discrimination of the signal can be more correctly performed, the power consumption in the variable band-pass filter 705 is increased. Therefore, in accordance with the state of the transmission power of the second wireless communication signal 107, the filtering characteristics of the variable band-pass filter 705 can be improved at the expense of the consumption power when the transmission power of the second wireless communication signal 107 is relatively high. Meanwhile, when the transmission power of the second wireless communication signal 107 is relatively low, the filtering characteristics can be made smooth, thus making it possible to reduce the consumption power in the variable band-pass filter 705.

Note that it is possible to simultaneously perform the change of the filtering characteristics in the variable band-pass filter 705, and the change of the signal characteristic of the first wireless communication signal 106 due to the reinforcement of the transmission signal of at least a part of the first wireless communication signal 106 on the frequency axis, or due to the expansion of the frequency position of the first wireless communication signal 106.

Embodiment 3

This embodiment is a modified example of the wireless communication system and the wireless communication device according to the embodiment 2, showing a state in which at least one of the signal for pilot channels, the signal for paging channels, and the signal for notification channels is positioned in the anchor frequency range.

The structure of the wireless communication system according to this embodiment is also the same as that of FIG. 1, and therefore explanation therefore is omitted. Also, the structure of the mobile equipment 102 is also the same as that of FIG. 10, and therefore explanation therefore is omitted.

Figure 15:
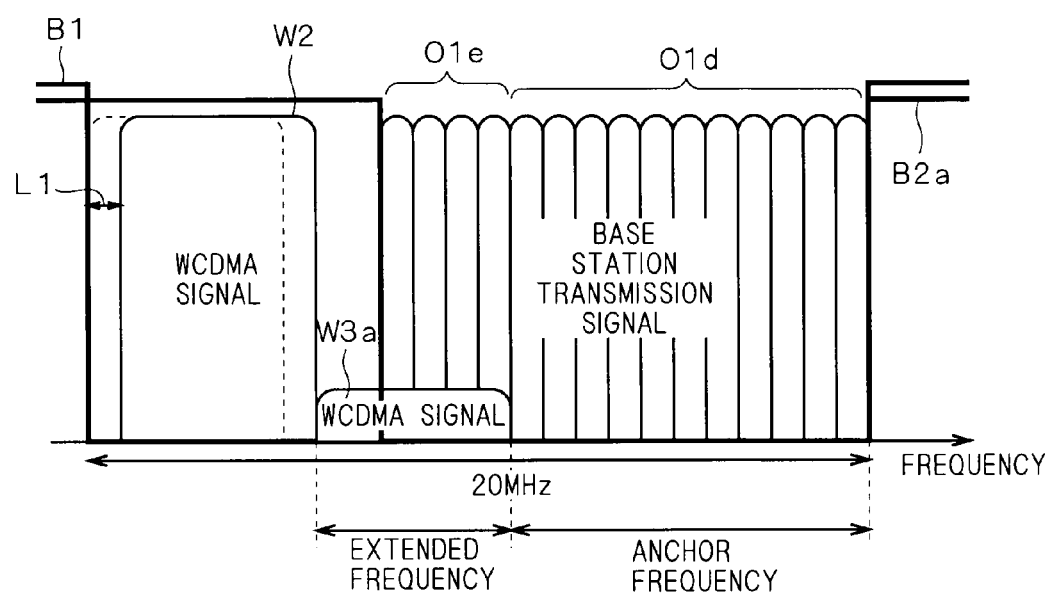
FIG. 15 is a view showing an example of changing signal characteristics of the first wireless communication signal, by expanding the position of the first wireless communication signal on the frequency axis to the area of the second wireless communication signal in an embodiment 3.

Next, by using FIG. 15 and FIG. 16, the operation of the wireless communication system according to this embodiment will be explained. FIG. 15 is a view showing the example of changing the signal characteristics of the first wireless communication signal 106, by expanding the position of the first wireless communication signal 106 on the frequency axis to the area of the second wireless communication signal 107. Also, FIG. 16 is a view showing the example of the time allocation of the first and second wireless communication signals 106 and 107 before/after the change in FIG. 15.

Figure 16:
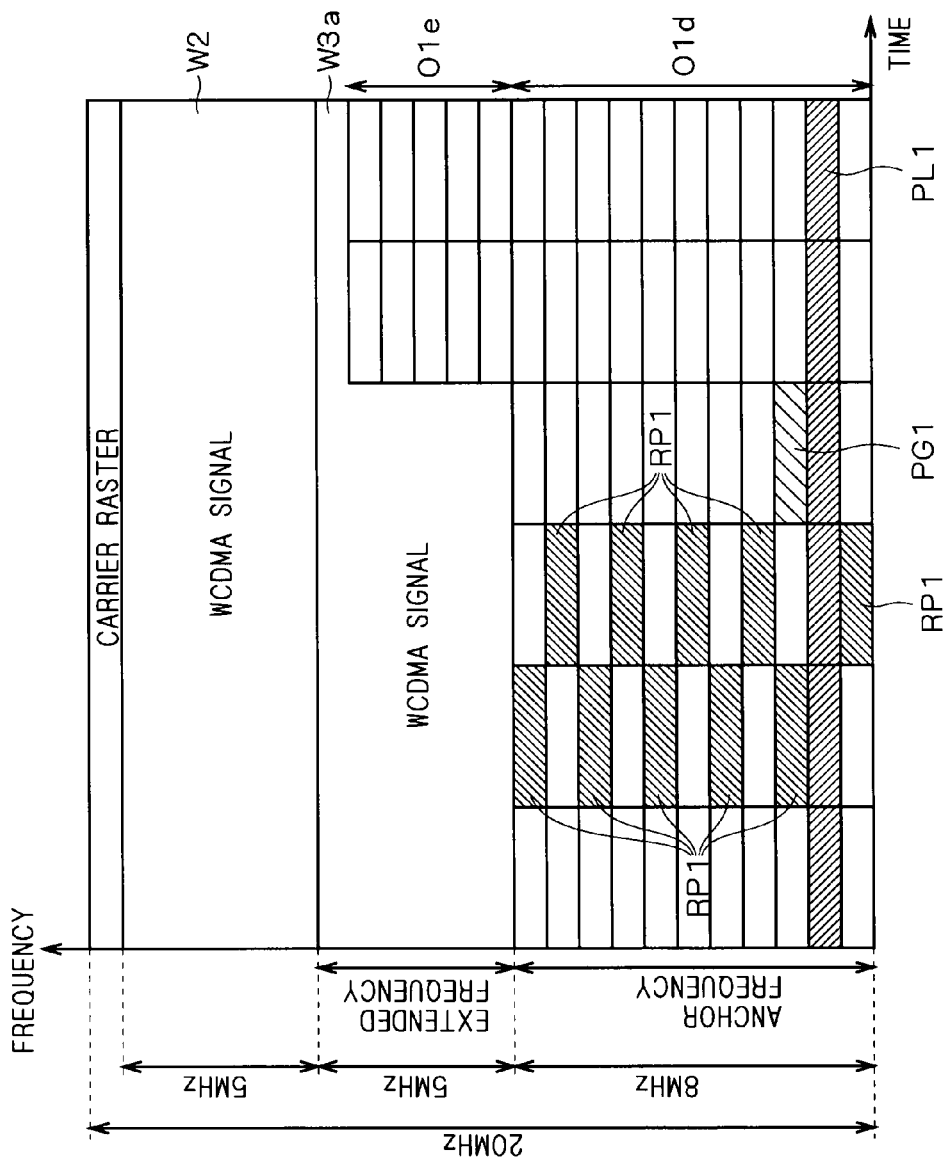
FIG. 16 is a view showing an example of the time allocation of the first and second wireless communication signals before/after change in FIG. 15.

Note that in FIG. 15 and FIG. 16, two waves, W2, W3a, of the W-CDMA signal having width of 5 MHz exists in the maximum frequency width of 20 MHz, and the positions of the W-CDMA signals W2, W3a are moved on the frequency axis by the carrier raster L1. In addition, the OFDM signal exists in the remaining frequency band. The extended frequency O1e is included in the OFDM signal in addition to the anchor frequency O1d.

As shown in FIG. 16 showing the example of the time allocation of the first and second wireless communication signals 106 and 107 before/after change, in the same way as the case of the embodiment 2, the OFDM signal also has the signal in the extended frequency O1e in addition to the anchor frequency O1d, after expansion of the frequency position of the first wireless communication signal 106 by the base station 101.

As the anchor frequency range, it is possible to use the frequency range in which the size of the frequency band is not frequently changed, or the frequency range generating no overlapping of frequency with the communication system of other communication system, or the frequency range generating no overlapping of frequency with the communication system of the same communication system in which there is no orthogonal signal (the range generating no overlapping of at least anchor frequencies), or the frequency range of low interference level without influence on the communication as a positional condition of the base station.

In addition, as the extended frequency range, it is possible to use the frequency range in which the size of the frequency band is frequently changed; or the frequency range generating overlapping of frequency with the communication system of other communication system, or the frequency range generating overlapping of frequency with the communication system of the same communication system in which there is no orthogonal signal (the area generating overlapping of frequency with at least anchor frequency range of other communication system), or the frequency range of interference level with influence on the communication when there is a heavy traffic as the positional condition of the base station.

The first wireless communication signal 106 includes at least one of the signal for the pilot channels, the signal for the paging channels, and the signal for the notification channels. Then, according to this embodiment, as shown in FIG. 16, common channel signals such as a common pilot channel signal PL1, a notification channel signal RP1, and a paging channel signal PG1 are positioned in the anchor frequency range.

When signal processing of the control channel for wireless connection is performed without transmitting/receiving data, for example, the variable band-pass filter 705 is set so that only the signal of the range of the anchor frequency O1d can pass through this filter. The width of the anchor frequency range may be set to the width of the maximum frequency band capable of avoiding the interference with other communication system.

As shown in FIG. 16, even when the carrier raster L1 is performed to the W-CDMA signals W2, W3a, the anchor frequency O1d of the present invention can be flexibly set according to an environment, and the anchor frequency width may be set to, for example, 20 MHz-5 MHz-5 MHz-carrier raster=8 MHz.

According to this embodiment, the signal PL1 for the pilot channels, the signal PG1 for the paging channels, and the signal RP1 for the notification channels are positioned in the range of the anchor frequency O1d. Therefore, more important signal for the pilot channels, signal for the paging channels, and signal for the notification channels are not positioned in the range of the extended frequency O1e having possibility of interference between the second wireless communication signal 107 and the first wireless communication signal 106, thus making it possible to realize the wireless communication system with little possibility of malfunction due to interference.

Since there is no interference with other communication system in the anchor frequency O1d, when the signal for the pilot channels, the signal for the paging channels, and the signal for the notification channels are positioned dispersively within the range of the anchor frequency O1d, signal transmission becomes strong against frequency selective fading. FIG. 16 shows a case of dispersively arranging the notification channels RP1 as an example.

In addition, when the position of the first wireless communication signal 106 on the frequency axis is expanded to the area of the second wireless communication signal 107, the base station 101 may include the information regarding the expansion of the position of the first wireless communication signal 106 on the frequency axis in the control information indicating the variable pass band in the variable band-pass filter 705, as relative increase/decrease amount from the anchor frequency range.

Specifically, the range of the extended frequency O1e is indicated by designation of the relative frequency from the anchor frequency O1d. For example, when indicated as +5 MHz, the extended frequency O1e has 5 MHz width in a higher side of the frequency from the anchor frequency O1d. Meanwhile, when indicated as −2 MHz, the extended frequency O1e is set as 2 MHz width in a lower side of frequency from the anchor frequency. Then, based on the control information, the first wireless communication signal 106 after expansion is selectively passed through the variable band-pass filter 705.

Thus, the base station 101 needs to transmit only relative increase/decrease amount from the anchor frequency range as the control information after expansion, thus reducing control information to be transmitted and realizing efficient information communication. Namely, signaling amount in association with change of the frequency is reduced, thus improving the frequency utilizing efficiency owing to reduction in signaling amount, particularly when the change of frequency is highly frequently performed.

Also, the base station 101 may include not the relative frequency designation from the anchor frequency O1d as described above, but the information regarding the expansion of the position of the first wireless communication signal 106 on the frequency axis in the control information indicating the variable pass band of the variable band-pass filter 705, as the decrease amount of the extended frequency range from the maximum value.

Specifically, although both of the anchor frequency O1d and the extended frequency O1e are designated by the information of the frequency number having the maximum value of each range allotted in advance, when the range of the extended frequency number O1e is indicated as "−375 kHz" from its maximum value by the base station 101, the extended frequency O1e may be made narrower than the maximum value by −375 kHz. Then, based on the control information, the first wireless communication signal 106 after expansion is selectively passed through the variable band-pass filter 705.

Thus, only the decrease amount from the maximum value of the extended frequency range may be transmitted by the base station 101 as the control information after expansion. This makes it possible to reduce the amount of control information to be transmitted and achieve efficient information communication.

Note that in order to monitor the signal strength of the signal of other communication system in preparation for a case in which the signal of other communication system (such as W-CDMA signal W3a in FIG. 15) is changed drastically to increase the transmission power, as shown in the upper part of FIG. 11, a certain space (for example, a minimum unit (such as 375 kHz) that can be monitored)) is kept in the range closest to the signal of other communication system within the pass band of the fixed band-pass filter 701 of the mobile equipment 102. Thus, it is possible to eliminate a complicated processing such as providing a non-transmitting/receiving section in which timings are matched between the mobile equipment 102 and the base station 101.

MODIFIED EXAMPLE

In the aforementioned embodiments 1 to 3, explanation has been given, with the wireless communication system taken as an example, the wireless communication system including the first wireless communication device (base station 101) for generating and transmitting the first wireless communication signal (W-CDMA signal), the second wireless communication device (base station 104) for generating and transmitting the second wireless communication signal (OFDM signal) of the communication system different from the communication system of the first wireless communication signal, and the third wireless communication device (mobile equipment 102) for receiving the first and second wireless communication signals. However, the present invention is not limited to the first and second wireless communication signals of different communication systems. Namely, the present invention can be applied even in a case of the first and second wireless communication signals of the same communication system.

Using FIG. 17 and FIG. 18, explanation will be given for an example of applying the present invention to avoid the interference in the wireless communication system in which the first and second wireless communication signals of the same communication system are transmitted. Note that FIG. 17 is a view showing the wireless communication system according to this modified example, and FIG. 18 is a view showing the example of frequency allocation of the first and second wireless communication signals in this modified example.

Figure 17:
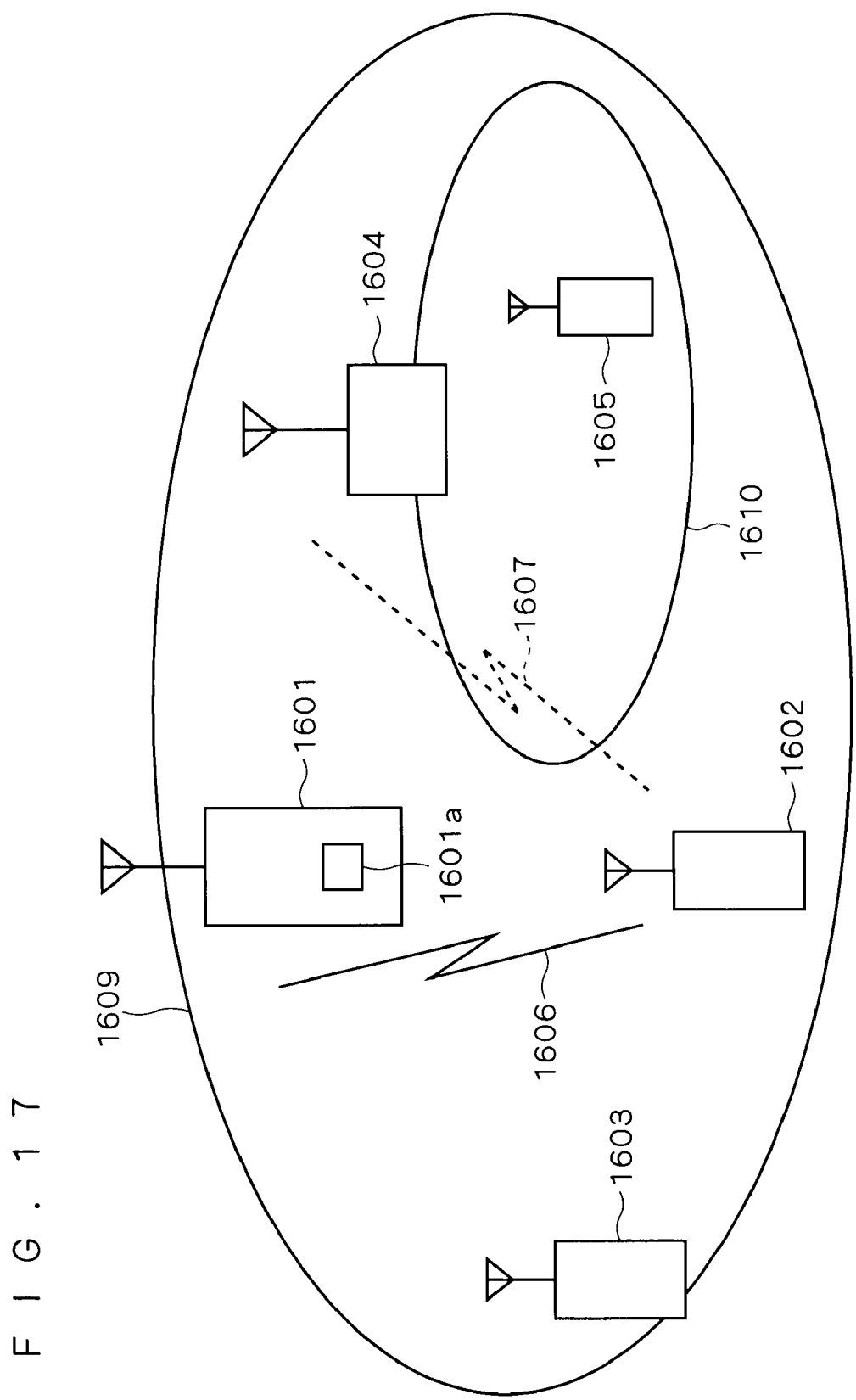
FIG. 17 is a view showing a wireless communication system according to a modified example.
Figure 18:
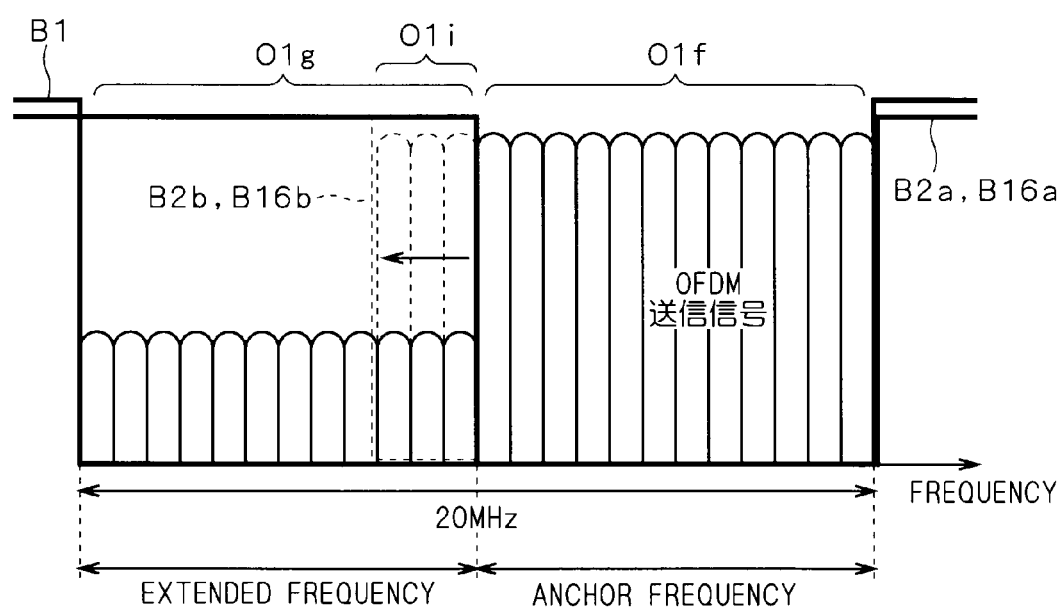
FIG. 18 is a view showing an example of frequency allocation of the first and second wireless communication signals.

As shown in FIG. 17, a base station 1601 and a base station 1604 are base stations of the same communication system (such as OFDM), and demodulation processing is performed in a different clock source. Therefore, a first and second wireless communication signals 1606 and 1607 transmitted from these base stations are not synchronized with each other. For example, because of the small low cost base station, a service area 1610 of the base station 1604 is narrow, thus making it impossible to support an entire part of the maximum frequency width 20 MHz (example). Note that a mobile equipment 1605 is the mobile equipment that performs communication with the base station 1604.

In addition, the base station 1601 is a large base station. Therefore, the base station 1601 can support the entire part of the maximum frequency width 20 MHz, and a service area 1609 of the base station 1601 is overlapped on the service area 1610 of the base station 1604. The mobile equipments 1602 and 1603 are the mobile equipments that perform communication with the base station 1601. The signal 1606 represents the signal that is communicated between the base station 1601 and the mobile equipment 1602. The signal 1607 shows a state in which the signal of the base station 1604 is propagated to the mobile equipment 1602 as interference.

Note that a reception block 1601a exists in the base station 1601, and the reception block 1601a has the same structure as the block diagram of the mobile equipment shown in FIG. 3 or FIG. 10.

The wireless communication system has the above-described structure, and therefore as shown in FIG. 18, when the first wireless communication signal 1606 is generated, the base station 1601 performs the signaling so as to set the frequency band O1f which is not supported by the small base station 1604, as the anchor frequency and setting the other place O1i as the extended frequency. Thus, even in a case of the signals of the same communication system generating overlapping, the interference wave can be removed by using only the anchor frequency O1f when a communication quantity is small, or a high speed communication can be realized by widely using the extended frequency O1i when a traffic of the base station 1604 of the same communication system is small. In addition, by positioning the signal of an important channel in the anchor frequency O1f, it is possible to avoid the interference, and a high-quality communication can be insured.

Figure 19:
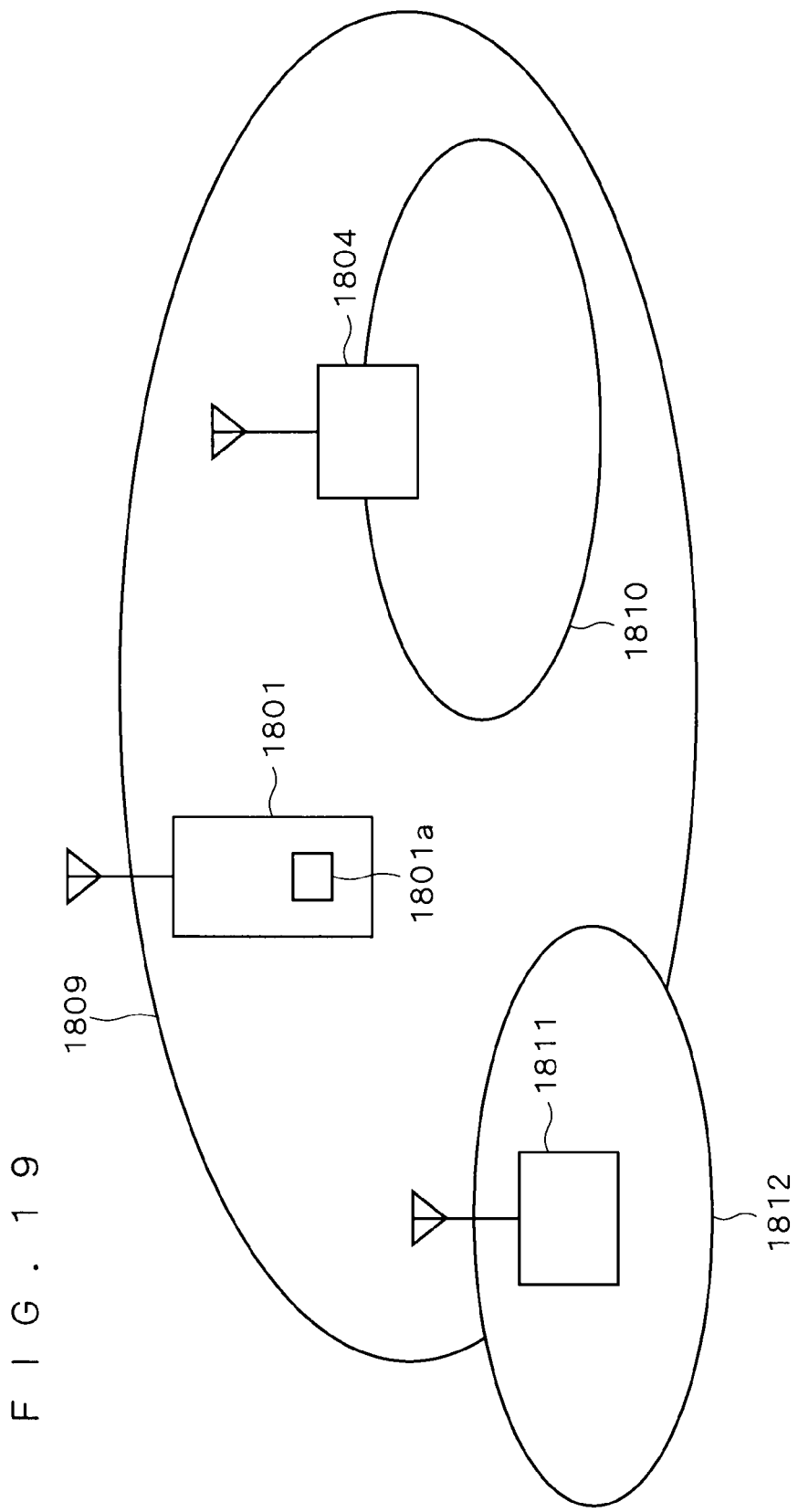
FIG. 19 is a view showing a wireless communication system according to an other modified example.
Figure 20:
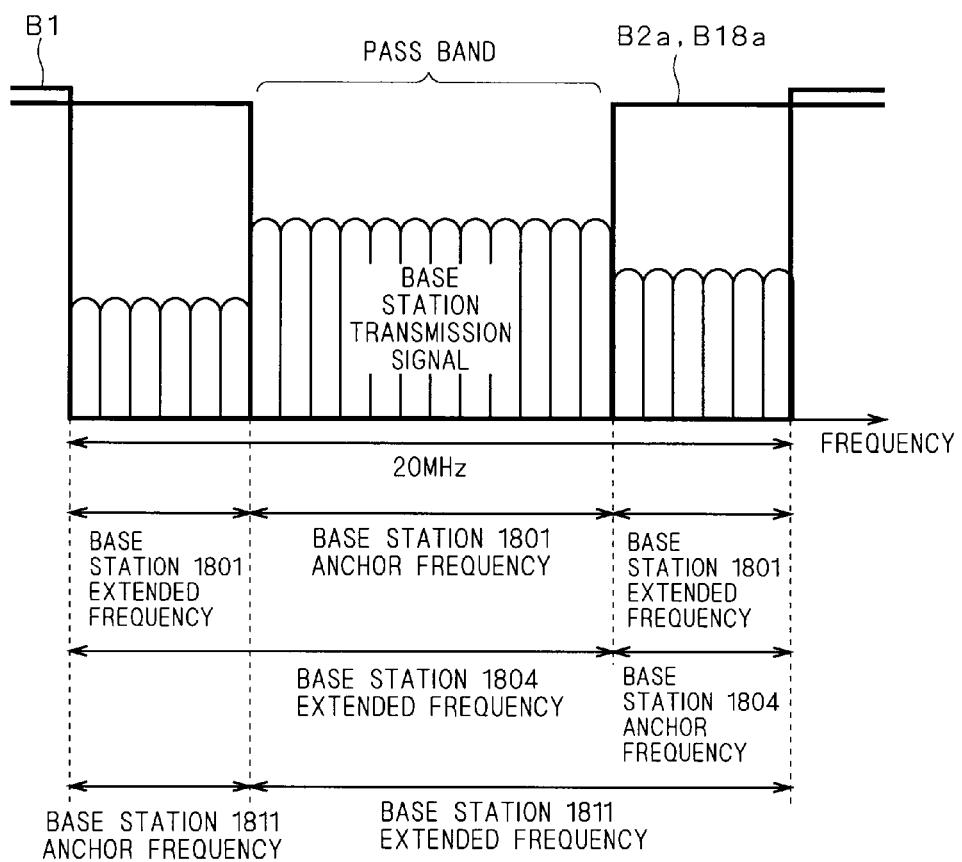
FIG. 20 is a view showing a downlink frequency allocation in an other modified example.
Figure 21:
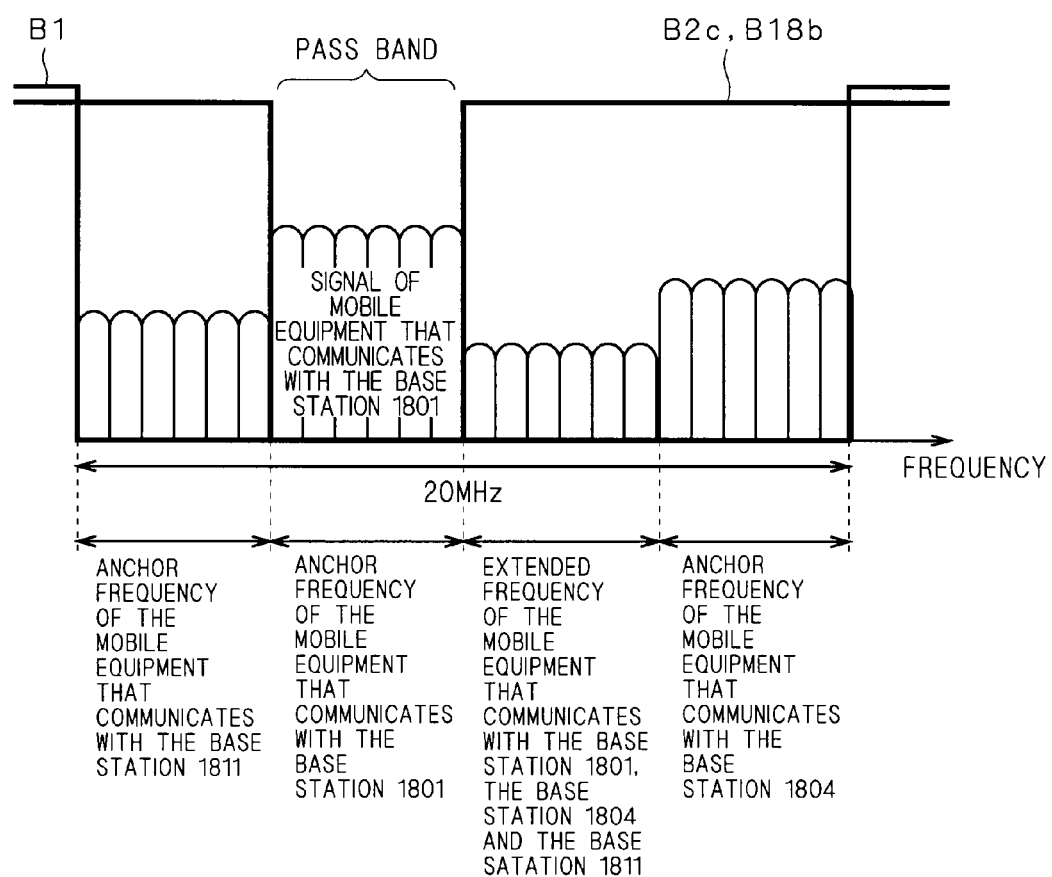
FIG. 21 is a view showing an uplink frequency allocation in an other modified example.

In addition, FIG. 19 is a view showing a wireless communication system according to other modified example, FIG. 20 is a view showing a downlink frequency allocation according to other modified example, and FIG. 21 is a view showing the uplink frequency allocation according to other modified example.

Base stations 1801, 1804, and 1811 in FIG. 19 are three non-orthogonal OFDM base stations. Note that a reception block 1801a exists within the base station 1801, and the reception block 1801a has the same structure as the block diagram of the mobile equipment shown in FIG. 10.

Each base station 1801, 1804, and 1811 has the same communication system in which each signal is not orthogonal to each other. In addition, for example the base station 1804 is a small base station for compensating for an insensitive zone of the base station 1801. In addition, for example the base station 1811 is the adjacent base station that exists at a position sufficiently away from the base station 1801.

As shown in FIG. 20, regarding the downlink (base station->mobile equipment) signal, in the base station 1801, 10 MHz in the middle of the frequency band where the interference level is low is set as the anchor frequency, and both adjacent sides are set as the extended frequency. In the base station 1804, 5 MHz, which is the higher side of the frequency of the frequency band where the interference level is low, is set as the anchor frequency, and the other 15 MHz is set as the extended frequency. In the base station 1811, 5 MHz which is the lower side of the frequency of the frequency band where the interference level is low, is set as the anchor frequency, and the other 15 MHz is set as the extended frequency. Thus, the frequency is shared among three base stations, without colliding of the common channels such as downlink notice information, and it is possible to realize the high speed communication which can be used by the remaining base station when the traffic is low in each base station, and which can efficiently utilize the frequency.

In addition, FIG. 21 shows the uplink signal of the mobile equipment that communicates with the base station from which the downlink signal in FIG. 20 is transmitted. In the mobile equipment that communicates with the base station 1801, the anchor frequency is set at 5 MHz width as shown and the frequency band different from the uplink. Also, the anchor frequency of the mobile equipment that communicates with the base station 1801 may be set as the frequency not to overlap with the downlink. In the mobile equipment that communicates with the base station 1811, although the anchor frequency is set at 5 MHz, being the lowest frequency, the extended frequency is set at a place away from the anchor frequency.

Even in the reception block 1801a of the base station 1801, the power measurement part 712 shown in FIG. 10 is provided, thereby monitor the uplink interference power, and when it becomes smaller than a certain threshold value, preferably, the base station 1801 transmits a transmission permit of data to the mobile equipment, after changing the setting of the variable band-pass filter 705 so as to change its own filter to the filter characteristics capable of removing undesired radio waves.

In addition, the base station can change the characteristics of the transmission signal by increasing the transmission power of the mobile equipment (for example, when the interference wave shows 3 dB in average within the band, the transmission power is increased by 3 dB).

As described above, even in a case of the wireless communication system having the base station of the same communication system generating the overlap, the interference wave can be removed by using only the anchor frequency when the communication quantity is small, or the high speed communication can be realized by widely using the extended frequency when the traffic in the base station of the same communication system is small.

The present invention has been explained in detail, however, the above-described explanation is given as examples in all aspects, and the present invention is not limited thereto. It appears that numerous modified examples not given as examples can be assumed without departing from the scope of this invention.

The invention claimed is:

1. A wireless communication system, comprising:
a first wireless communication device for generating and transmitting a first wireless communication signal;
a second wireless communication device for generating and transmitting a second wireless communication signal of a communication system different from the communication system of said first wireless communication signal, or the same communication system; and
a third wireless communication device for receiving said first and second wireless communication signals, wherein
said first wireless communication signal and said second wireless communication signal are adjacently positioned on a frequency axis;
said third wireless communication device includes a fixed band-pass filter through which received said first wireless communication signal and said second wireless communication signal are selectively passed at a fixed pass band, so that a signal of a total frequency band of said first wireless communication signal and said second wireless communication signal can pass through, and a first variable band-pass filter through which the signal passed through said fixed band-pass filter is selectively passed at a variable pass band,
said first wireless communication signal includes a control information indicating said variable pass band in said first variable band-pass filter; and
said control information is given to said first variable band-pass filter, thereby enabling said first wireless communication signal to be selectively passed through said first variable band-pass filter, while removing said second wireless communication signal.

2. The wireless communication system according to claim 1,
wherein when positions of said first wireless communication signal and said second wireless communication signal on the frequency axis are moved by said first wireless communication device and said second wireless communication device,
said control information is updated, so that said first wireless communication signal can be selectively passed through said first variable band-pass filter, while removing said second wireless communication signal.

3. The wireless communication system according to claim 1, wherein said third wireless communication device further comprises:
a second variable band-pass filter through which the signal passed through said band-pass filter is selectively passed at the variable pass band;
a power measurement part for measuring a power of the signal passed through said second variable band-pass filter; and
a transmission processing part for transmitting a measurement result in said power measurement part to said first wireless communication device;
said control information includes information indicating said variable pass band in said second variable band-pass filter;
said control information is given to said second variable band-pass filter, thereby enabling at least a part of said second wireless communication signal to be selectively passed though said second variable band-pass filter, while removing said first wireless communication signal; and
said first wireless communication device receives said measurement result and includes in said control information the information of changing signal characteristics of said first wireless communication signal and/or the information of changing filtering characteristics in said first variable band-pass filter, in accordance with a value of a transmission power of said second wireless communication signal.

4. The wireless communication system according to claim 3, wherein said first wireless communication device changes said signal characteristics of said first wireless communication signal by expanding a position of said first wireless communication signal on the frequency axis to an area of said second wireless communication signal, and
updates said control information so that said first wireless communication signal after expansion can be selectively passed through said first variable band-pass filter, while removing said second wireless communication signal.

5. The wireless communication system according to claim 3, wherein said first wireless communication device changes said signal characteristics of said first wireless communication signal by reinforcing a strength of a transmission signal of at least a part of said first wireless communication signal on the frequency axis.

6. The wireless communication system according to claim 3, wherein said first wireless communication device includes in said control information the information of changing said filtering characteristics so as to obtain steep filtering characteristics in said first variable band-pass filter in a case of a relatively high transmission power of said second wireless communication signal, and includes in said control information the information of changing said filtering characteristics so as to obtain smooth filtering characteristics in said first variable band-pass filter in a case of a relatively low transmission power of said second wireless communication signal, and
said first variable band-pass filter changes the filtering characteristics based on said control information.

7. The wireless communication system according to claim 4, wherein said first wireless communication signal includes at least one of a signal for pilot channels, a signal for paging channels, and a signal for notification channels;
the position of said first wireless communication signal on the frequency axis is divided into an anchor frequency range and an extended frequency range;
the position of said first wireless communication signal before expansion on the frequency axis corresponds to said anchor frequency range;
the position of an increase of said first wireless communication signal after expansion on the frequency axis corresponds to said extended frequency range; and
at least one of said signal for pilot channels, signal for paging channels, and signal for notification channels is positioned within said anchor frequency range.

8. The wireless communication system according to claim 7, wherein said first wireless communication device includes in said control information the information regarding expansion of the position of said first wireless communication signal on the frequency axis, as a relative increase/decrease amount from said anchor frequency range, and said first wireless communication signal after expansion is selectively passed through said first variable band-pass filter, based on said control information.

9. The wireless communication system according to claim 7, wherein said first wireless communication device includes in said control information the information regarding expansion of the position of said first wireless communication signal on the frequency axis, as a decrease amount from a maximum value of said extended frequency range, and said first wireless communication signal after expansion is selectively passed through said first variable band-pass filter, based on said control information.

10. A wireless communication device, which is a wireless communication device for receiving a first wireless communication signal and a second wireless communication signal of a communication system different from the communication system of said first wireless communication signal or the same communication system; wherein
   said first wireless communication signal and said second wireless communication signal are adjacently positioned on a frequency axis;
   said wireless communication device including:
   a fixed band-pass filter through which received said first wireless communication signal and said second wireless communication signal are selectively passed at a fixed pass band, so that a signal of a total frequency band of said first wireless communication signal and said second wireless communication signal can pass through; and
   a first variable band-pass filter through which a signal passed through said fixed band-pass filter is selectively passed at a variable pass band;
   said first wireless communication signal includes a control information indicating said variable pass band in said first variable band-pass filter; and
   said control information is given to said first variable band-pass filter, thereby enabling said first wireless communication signal to be selectively passed through said first variable band-pass filter, while removing said second wireless communication signal.

11. The wireless communication device according to claim 10, further comprising:
   a second variable band-pass filter through which a signal passed through said band-pass filter is selectively passed at a variable pass band;
   a power measurement part for measuring a power of a signal passed through said second variable band-pass filter; and
   a transmission processing part for transmitting a measurement result in said power measurement part to other wireless communication device, wherein
   said control information includes the information indicating said variable pass band in said second variable band-pass filter;
   said control information is given to said second variable band-pass filter, thereby enabling at least a part of said second wireless communication signal to be selectively passed through said second variable band-pass filter, while removing said first wireless communication signal.

* * * * *